Jan. 20, 1970
G. W. SMITH
3,491,194
CAPITAL EXPENDITURE SIMULATOR
Filed Feb. 5, 1968
2 Sheets-Sheet 1
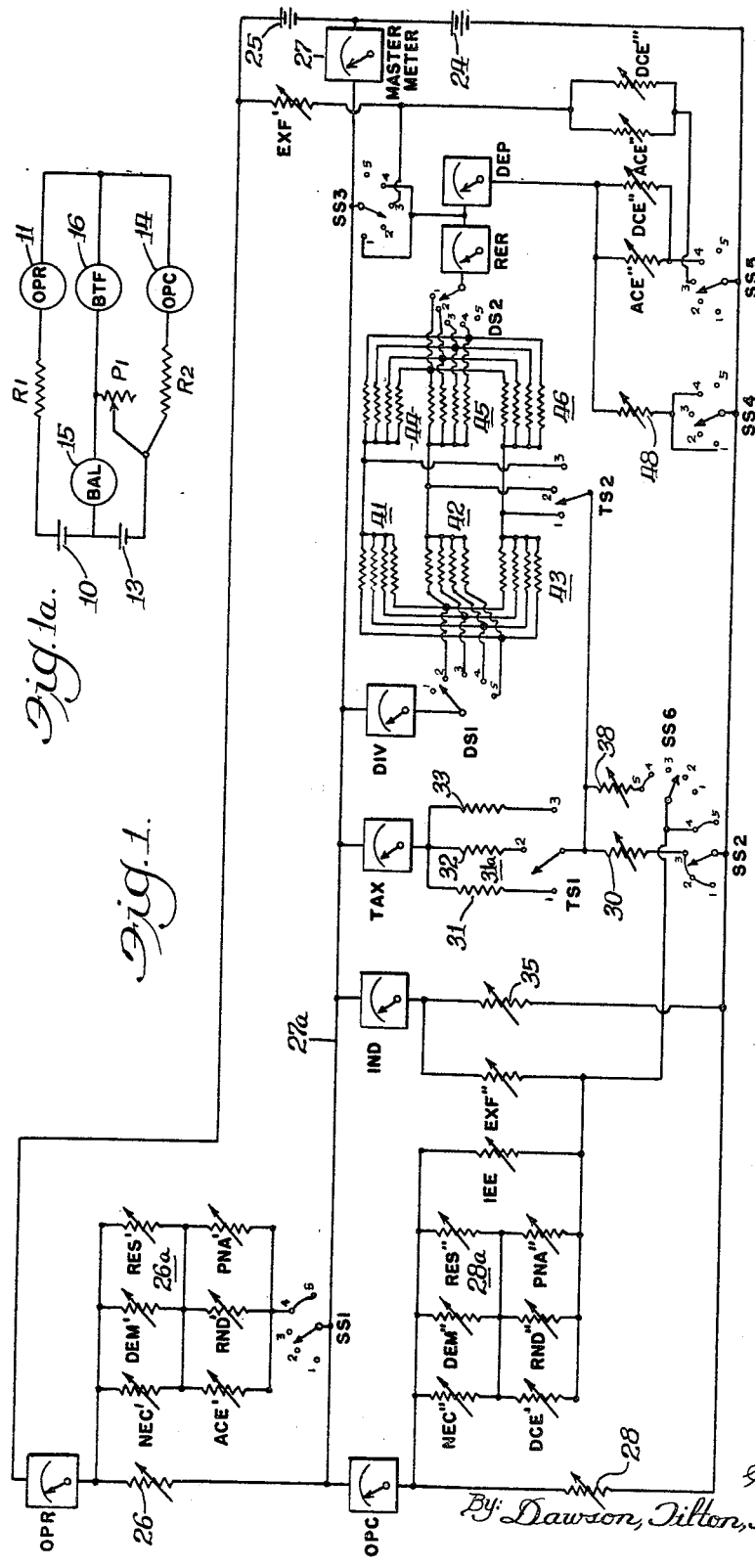
Inventor:
Gerald W. Smith
By Dawson, Tilton, Fallon & Lungmus
Attys.

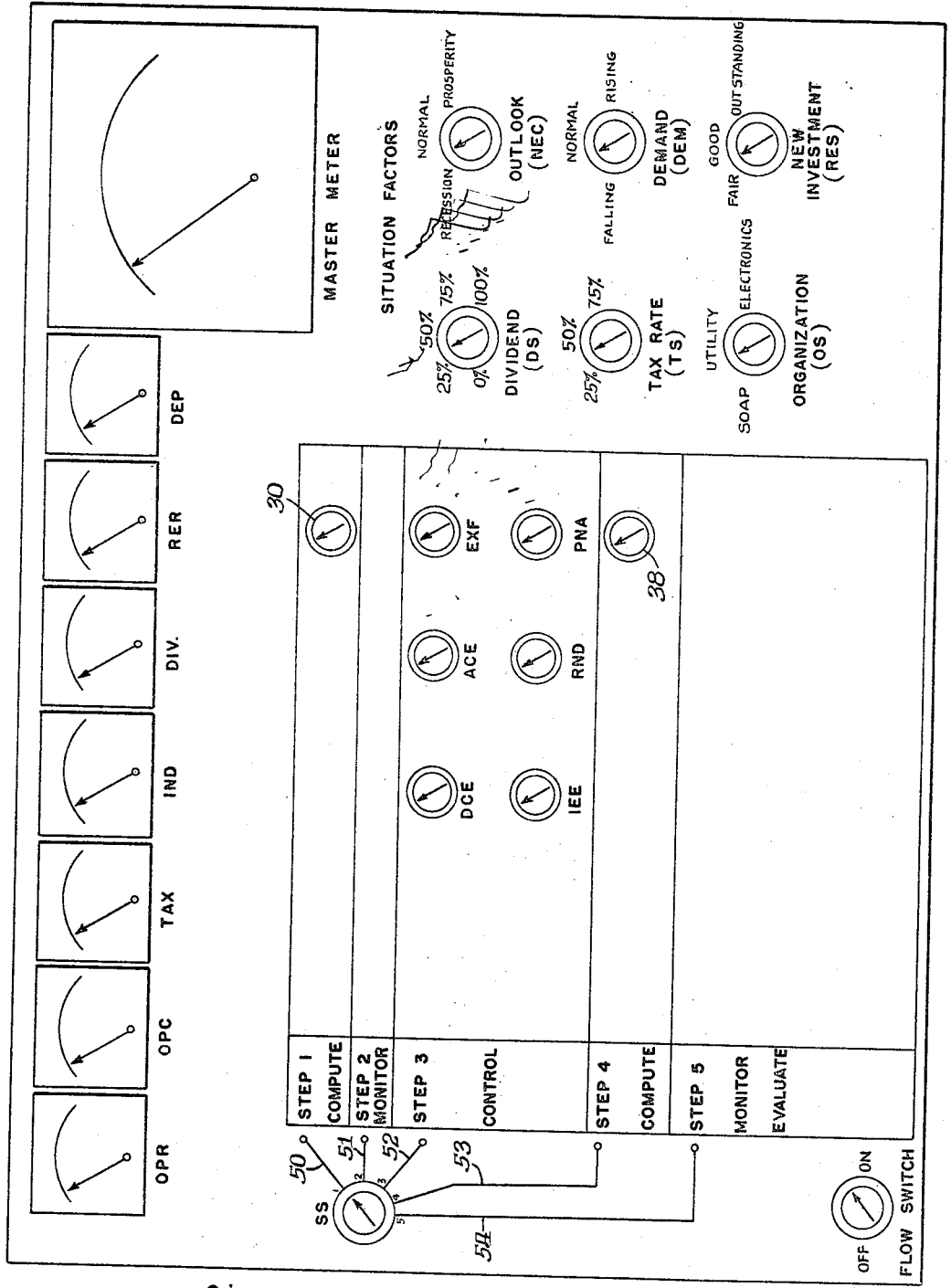

United States Patent Office 3,491,194
Patented Jan. 20, 1970

3,491,194
CAPITAL EXPENDITURE SIMULATOR
Gerald W. Smith, Ames, Iowa, assignor to Iowa State University Research Foundation, Inc., Ames, Iowa, a corporation of Iowa
Filed Feb. 5, 1968, Ser. No. 703,113
Int. Cl. G09b *19/18;* G06g *7/48*
U.S. Cl. 35—24                                                                 9 Claims

ABSTRACT OF THE DISCLOSURE

A simulator for illustrating the effects of various parameters and variables in an accounting system is based on the concept that electrical current flow is analogous to cash flow and that the computation of expenditures and returns may thus be measured in current. Fixed and variable resistive elements are arranged in a network with potential sources to simulate the algebraic manipulation of the economic interrelationships; and ammeters provide a convenient visual display for the parameters under study. A master step switch is wired into the simulator to energize networks as they are required in the various steps; and the effects of selected external, subjective factors are coupled into the simulator.

BACKGROUND

The present invention relates to electronic simulators; more particularly, it relates to a system employing passive electronic elements for simulating the overall cash flow of a company or business under study.

Although the system of the present invention may be used to compute estimates in analyzing the profit and loss picture for a company; it has been found to be particularly useful in demonstrating the interrelationships between the various operating parameters of a company and the overall profit and loss statement for that company. In this aspect, namely, its use as a teaching machine, the present invention is a step in the opposite direction from the current trend in a good number of college classrooms wherein it is sought to simulate the various mathematical models of systems under study by either programming them on a digital computer or by connecting the elements of an analog computer to simulate the system.

Analog and digital computers are expensive both in original cost and in operating cost; further, a student gains relatively little intuition as to just what the system's interplay is when sitting at the console of a large computer.

SUMMARY

The present invention uses conventional, passive circuit elements, namely, fixed and variable resistors, together with ammeters and batteries and switches to provide a wired-in simulator for analyzing capital expenditures. It provides a teacher with a low-cost, portable teaching device having separate displays for each of the parameters affecting an economic system with a fairly sophisticated and accurate simulation of the system.

With the present device, one can obtain a fairly detailed knowledge of the effect of various parameters on the system immediately and without the need to obtain access to a more expensive computer.

Other features and advantages of the present invention will be obvious to persons skilled in the art from the following detailed description of the preferred embodiment accompanied by the attached drawing, wherein identical reference characters will refer to like parts in the various views.

THE DRAWING

FIG. 1 is a detailed circuit schematic diagram of a device according to the present invention;

FIGS. 1a–1d illustrate typical circuit in figurations for representing desired functions; and FIG. 2 illustrates a preferred panel layout for the device of FIG. 1.

DETAILED DESCRIPTION

In a conventional classroom presentation of capital expenditure concepts, a teacher generally must consider those factors which influence capital expenditure decisions on an ad hoc basis. The present invention dramatically emphasizes that this is an over-simplified analysis and the real situation is complicated by interacting factors which are subject to simultaneous manipulation and change. The distinction is apparent even upon inspection of the simulator where a multitude of control knobs emphasizes physically that simultaneous adjustment, that is control, is possible.

The interaction of these controls becomes apparent in the operation of the device or by inspection of the circuit diagram. For example, increasing the corporate income tax rate decreases the funds available for capital expenditures for future periods; borrowing external funds increases the cash flow for interest on a debt for a future period. Various subjective factors, such as a recession forecast for the national economy, reduces the sensitivity of the market to aggressive capital expenditures. Further, depending upon the type of company which is under study, other subjective factors alter the sensitivity of certain of the economic system parameters; for example, a public utility is less responsive to price and advertising expenditures than a consumer product firm; and neither of these may be as responsive to research and development expenditures as is an electronic products company. These and other factors attributable to the type of organization or product line are simulated by means of a multiwafer switch and sets of fixed resistors which permits variation of the fixed component of circuit resistances to simulate sensitivity changes in parameters such as aggressive capital expenditures, defensive capital expenditures, research and development, price and advertising, operating costs, interest on debt capital, and depreciation expense.

The search for optimum expenditure levels for the many parameters emphasizes both the dynamic nature of any solution, as well as the fact that most of the parameters may assume values in a continuum or range rather than discrete points.

In addition, the time pressure for decisions may be simulated in the apparatus by fixing the time allowed between computation steps in the various stages. The nature of the imperfection of the information available becomes apparent to a student who proceeds through the simulator steps for the first time. When the experience is repeated, past information provides a helpful, but imperfect guide to action.

That a manager has only partial control over the economic parameters is emphasized by simulating the economic system by means of fixed and variable resistors connected in series.

If maximum capital expenditures of both types are selected, the external funds will not be sufficient to bring the "funds flow" into balance. Thus, the simulator depicts a very realistic rationing of available funds. Such well-known concepts as diminishing returns to scale, the U-shaped cost curve, and the managerial "balancing" required in budgeting are easily wired into the simulator.

Before proceeding into a detailed description of the circuit schematic of a preferred network for the simulator, it will be helpful to realize the analogy between certain corporate cash flow concepts and their corresponding electrical parameter or circuit elements. For example, the electrical counterpart of corporate cash flow may be current; and expenditures or receipts in dollars may be measured in amperes or milliamperes. The scale of dollars to amperes may be easily adjusted over several orders of magnitude without changing the basic accuracy or values of the economic parameters.

Some cash flows are additive, for example retained earnings plus depreciation expense equals internally generated funds. This can be simulated by placing a network of parallel resistors across a voltage source and measuring the total current through the source. Thus, if one resistor is set at a value representative of retained earnings and the other resistor is set at a value representative of depreciation expense, the current through each resistor is an analog of its economic counterpart, and the total current will be representative of internally generated funds.

Other cash flows are subtractive; for example operating revenues less operating costs equals before-tax cash flow. This can be simulated electrically by forcing current representative of operating revenues through one branch of a network in one direction and forcing current through the same branch of the network in an opposite direction by a source which bucks the first source so that the opposing current is set at a value representative of cash operating costs. Thus, the net current flowing in the first direction through the branch is representative of before-tax cash flow. This concept of having additive currents in one loop of a network and subtractive currents in another with the totals flowing through a common branch is made use of in the overall design of the inventive simulator.

Another analogy which is made use of in the present invention is that budgets and cash flows must balance. Managers have partial control over current operating revenues and current operating costs. The electrical counterpart of this limited-control phenomenon is found in a bridge circuit, such as the one shown in FIG. 1a, wherein one branch of the circuit includes the series combination of a potential source 10, a fixed resistor R1, and a meter 11 labeled OPR representative of current operating revenue. In circuit across this first branch is a second branch including a second potential source 13, a series resistor R2, and a meter 14 labeled OPC and representative of current operating costs. The diagonal branch of the bridge includes a meter 15, captioned BAL (and representative of balance) in series with a meter 16 captioned BTF (representative of before-tax cash flow). A variable resistor P1 is connected between the common terminal of the meters 15 and 16, and the terminal between the source 13 and the resistor R2 to indicate that a manager has a limited control in seeking a balance which is represented by zero current in the meter 15. That is, partial control of the circuit is afforded by the variable resistor P1, but this does not insure that a balance will always be struck, depending on the values of R1 and R2.

Some cash flows may be separated into relatively constant proportions; for example, taxable income may be separated into two parts, income tax and net income. In a similar manner, net income may be separated into dividends and retained earnings according to a management-determined proportion. These two phenomena may be simulated electrically by a parallel combination of resistors connected in series with a variable resistor across a voltage source, wherein the total current flowing through the source is the sum of the currents flowing through the two resistors. In such a circuit, the combined effective resistance of the parallel combination of resistors is fixed and small relative to the series-connected resistance of the circuit, thus providing a means of proportionate division without changing the total current flow.

In general, dependent variables may be simulated by means of a series of variable resistances. Variables to which an output is sensitive may be simulated by a variable resistor in series with a fixed resistor which is small relative to the range of the variable resistor; variables to which an output is insensitive may be simulated by a variable resistor in series with a relatively large value of fixed resistance. Independent variables may be simulated by parallel variable resistors; and interdependent variables may be simulated by individual variable resistors connected to opposite terminals of a potential source and coupling the movable contacts of the resistors together.

In determining optimum expenditure levels, expenditures for certain efforts, for example, industrial engineering effort, may first show diminishing returns to scale and then, with overemphasis, they may show negative returns to scale. This defines the well-known U-shape cost curve in which "operating costs" include those for the industrial engineering effort. The optimum level, of course, is when the derivative of the curve of operating costs versus industrial engineering effort reaches zero. This is simulated in the circuit diagram of FIG. 1b wherein a potential source $10'$ is connected to the junction between the series circuit of a fixed resistor $R1'$ and a fixed resistor $R2'$. The other terminal of the source $10'$ is connected to the movable contacts of variable resistors $P_1'$ and $P_2'$ which are connected in common. One end of each of the variable resistors $P_1'$ and $P_2'$ is connected respectively to the remote terminals of the fixed resistors $R_1'$ and $R_2'$.

The net effective resistance across the source $10'$ is illustrated in FIG. 1c which depicts the total ohms in thousands against the travel of the variable resistors. The line designated 18 represents the total resistance of $R_2'$ and $P_2'$ and the dotted line 19 represents the total resistance of $R_1'$ plus $P_1'$. The total effective net resistance is depicted by a dashed line $R_T$. Now plotting the current through the source $10'$ of FIG. 1b, a reference is made to FIG. 1d in which the total current flow is platted against the travel on the ganged variable resistors. The overall curve is the U-shaped curve 20, and the optimum level is designated as the minimum value of the curve 20. It will be apparent that the curve 20 is comprised of an uncontrollable portion defining a minimum below which the curve cannot move, and a controllable portion defining a range over which the total current flow is variable.

In simulating a phenomenon characterized by a diminishing return to scale, successive increments of an improvement input factor result in successively smaller increments of improvement until the increment of improvement is zero. This may be simulated by means of a fixed constant resistance in series with a variable resistance, and the current through the series combination is the analog of the function exhibiting a diminishing return to scale. Increasing reluctance to provide additional funds or the limited ability to obtain external funds is analogous to the current response when the variable resistor value is decreased while the fixed resistor in series acts to limit the maximum current flow (i.e., funds).

CIRCUIT DESCRIPTION

In the description of the preferred circuit arrangement, understanding of the operation of the system will be facilitated by referring to various of the switches, circuit elements, and meters by means of reference characters representative of the function performed; thus, the meters and variable resistors are sometimes designated by a series of characters which may be related to their function and to the preferred location of the element or meter on the face panel of a control console. The face panel has been designed in order to facilitate understanding of the economic interplay as well as the easy calculation of the various economic factors.

An easy reference for the various reference characters and symbols as they relate to the function being performed or simulated is included in Table I.

TABLE I

| Element | Symbol | Function or Analog |
|---|---|---|
| Switch | TS | Tax switch (two wafers). |
| | DS | Dividend switch (two wafers). |
| | SS | Master step switch (six wafers). |
| | OS | Organization switch. |
| Meter | OPR | Operating revenues. |
| | OPC | Cash operating costs. |
| | IND | Interest on debt capital. |
| | TAX | Tax on income. |
| | DIV | Dividends paid. |
| | RER | Retained earnings. |
| | DEP | Depreciation expense. |
| Var. resis. | ACE | Aggressive capital expenditures. |
| | DCE | Defensive capital expenditures. |
| | EXF | External funds. |
| | IEE | Industrial engineering effort. |
| | RND | Research and development. |
| | PNA | Price and advertising policy. |
| | NEC | Outlook for national economy. |
| | DEM | Demand for our product or service. |
| | RES | Results from efforts to discover new investment opportunities. |

When relating the above reference designation to the circuit elements, it will be noted that all the variable resistors for any given parameter (such as EXF, NEC, DEM, RES, ACE, RND, PNA, and DEC) are mechanically interlocked and thus are controlled by turning a common shaft. Where there are separate resistors for a given parameter, a prime notation will be used to distinguish them. Further, for those switches which have a number of separate wafers, the position of each is controlled by turning a common shaft, and each wafer is distinguished by a reference numeral following the reference characters identifying the switch.

Referring now to FIG. 1, two sources of potential are designated 24 and 25 and they are preferably sources of DC potential having equal terminal voltage. The sources 24 and 25 are connected positive-to-negative; and they are associated with what will hereinafter be referred to as the negative and positive loops in the overall network. A common branch is designated by the wire 27a which is sometimes referred to as the null line since zero current in this line represents a balance. Understanding of the operation and function of the circuit will be facilitated if it is borne in mind that the total current flowing in the positive loop is the analog of total revenues and the total current flowing in the negative loop is the analog of total costs. To balance, total revenues must equal total costs.

Describing first the positive loop of the network, a meter labelled OPR is connected in series with a variable resistance 26, and a master meter 27 across the terminals of the source 25. A master step switch SS has six separate wafers (SS1–SS6); and there are five independent fixed contacts or positions on each of the wafers. The first wafer, SS1, has its movable contact connected to the null line 27a.

The fixed contact positions 4 and 5 of the wafer SS1 are connected in common, and they are also connected to one side of variable resistors ACE', RND', and PNA'. The other side of each of these variable resistors is also connected in common; and three other variable resistors, namely, NEC', DEM', and RES' are each connected respectively between the common junction of the three variable resistors ACE', RND', and PNA', and the positive side of variable resistor 26. This network of resistors is generally referenced 26a. A variable resistor EXF' has one terminal connected to the positive terminal of source 25 and the other terminal connected to the third fixed contact of wafer SS3. With this particular portion of the positive loop of the network configuration, one is able to generate or simulate the total operating revenue, OPR, as measured in the meter OPR and the external funds available.

Turing now to the negative loop of the network, the movable contact of the wafer SS2 is connected to the negative terminal of the source 24; and the first three fixed contact stations of the wafer SS2 are connected in common. A variable resistor 30 is connected in series with the first three fixed stations of SS2, and it couples them to the movable contact of a first wafer of a tax switch TS1. Each of two wafers of the tax switch TS1 and TS2 has three fixed contact positions or stations; and for the first wafer, each of the three fixed stations is coupled respectively through one of the three fixed resistors 31, 32, and 33 to a meter designated TAX which has its other terminal connected to the null line 27a. The variable resistor 30 is in series with meters TAX, DIV and RER when SS2 is in positions 1–3 and provides control in the negative or "cost" loop of the network to balance the master meter 27, as will be explained.

The fixed stations 4 and 5 of SS2 are connected in common and coupled to a network of variable resistors, one of which, EXF" is coupled to the null line 27a through a meter IND. The common stations 4 and 5 of SS2 are also connected to four variable resistors DCE', RND", PNA", and IEE. The other terminal of the variable resistors DCE', RND", and PNA" are connected in common to the three other variable resistors NEC", DEM", and RES". The other terminals of the three resistors NEC", DEM", and RES" are connected in common to the other terminal of the variable resistor IEE which common terminal of all four resistors is connected through a meter OPC to the null line 27a.

A variable resistor 28 is connected between the negative terminal of the meter OPC and the negative terminal of the source 24. The network of resistors NEC", DEM", RES", DCE', RND", PNA" and IEE is generally referenced 28a.

The negative terminal of the source 24 is also connected through a variable resistor 35 to the meter IND.

The number 4 and 5 positions of the wafer SS2 are also connected to the movable contact of the wafer SS6; and the number 4 and 5 positions of that latter wafer are connected through a variable resistor 38 to both movable contacts of the first and second wafers of the switch TS. Variable resistor 38 is in series with meters TAX, IND and RER when SS2 is in positions 4 and 5 for providing control in the negative or "cost" loop to balance the master meter 27 at zero, as explained more fully below.

There are three fixed contacts associated with the wafer TS2, and each is connected to a set of fixed resistors which, in turn, are connected to separate fixed contacts of the first wafer of a dividend switch denoted DS1. These three sets of fixed resistors are generally designated 41, 42 and 43, and each of the sets of resistors 41–43 includes four separate fixed resistors with each set of resistors including four different values. A meter DIV couples the movable contact of DS1 to the null line 27a.

Similarly, each of the three fixed contacts of TS2 is connected to a second set of four fixed resistors, designated respectively 44, 45 and 46, which, in turn, are connected to four of the fixed contacts of the wafer DS2. Each set of the resistors 44–46 contains four separate values of resistance. It will be obvious that any number of discrete resistors could be included in the sets 41–46. The resistor set-pairs 41 and 44, 42 and 45, 43 and 46 each contain the same four resistor values, and each set of pairs is associated with one of the fixed resistors 31, 32, and 33 respectively. Within these pairs, the dividend switch (DS1 and DS2) alters the proportion of current flow, but not the total current through the pairs. Furthermore, the tax switch (TS1 and TS2) alters the proportions of current flow, but not the total current through the sets of resistances 33, 41, and 44; or 32, 42, and 45; or 31, 43, and 46. In other words, the values of the resistor 31, 32, and 33 are first set to represent discrete tax rates; and with these in mind, the values for their associated set-pairs is designed such that the total current flow is constant. Thus for whatever tax rate is set by the tax switch TS, the dividend rate will be settable independently of it by the switch DS. A meter RER is connected between the movable contact of DS2 and the first and fourth positions of the third wafer of the step switch, SS3. The movable contact of SS3 is connected directly to the null line 27a.

The movable contact of wafer SS4 is connected to the negative terminal of the source 24; and the first and fourth fixed contacts of the wafer SS4 are coupled through a variable resistor 48 to a meter DEP, the output terminal of which is connected to the output terminal of the meter RER.

The movable contact of the wafer SS5 is connected to the negative terminal of the source 24; and the fixed contact 4 of the wafer SS5 is coupled through two parallel variable resistors ACE″ and DCE″ to the meter DEP. The third fixed contact of the wafer SS5 is coupled through two other variable resistors ACE‴ and DCE‴ to the third fixed contact of the wafer SS3.

In summary, the negative or "cost" loop of the network includes a plurality of parallel branches. Proceeding from left to right in FIG. 1, the first branch is for simulating operating costs; and it includes a variable resistor 28, the network (generally designated 28a) of variable resistors NEC″, DEM″, RES″, DCE″, RND″, PNA″ and IEE which is selectively switchable in series with the meter OPC by SS2. The second branch simulates interest on debt capital; and it includes the meter IND and its associated resistors 35 (which is permanently connected in circuit) and EXF″ which is selectively switchable in circuit through SS2.

The third branch simulates tax on income; and it includes the meter TAX together with its associated network (generally identified by reference numeral 31a) of resistors switchable by means of the switch TS1 and the variable resistors 30 and 38.

The fourth branch simulates dividends paid; and it includes the meter DIV, the first wafer of the dividend switch, DS1, the sets of discrete resistor values 41–43 selected by the second wafer of the tax switch TS2, and the variable resistors 30 and 38.

The fifth branch in the negative loop of the network simulates retained earnings; and it includes the meter RER, the second wafer of the dividend switch DS2, the sets of fixed resistors 44–46 selected by means of the second wafer of the dividend switch TS2, and the variable resistors 30 and 38.

A sixth branch of the negative loop simulates depreciation expenses; and it includes the meter DEP and the variable resistors 48 selected by the fourth wafer of the master step switch, and the variable resistors ACE″ and DCE″ selected by the fifth wafer of the master step switch.

Finally, a seventh branch of the negative loop includes the variable resistors ACE‴ and DCE‴ which are selectively included in the negative loop by means of the wafers SS3 and SS5.

Because it is not essential to the understanding of the network, a multiwafer organization switch (OS) has not been shown in FIGURE 1. This switch permits the simulation of parameters and sensitivities appropriate to various types of organizations such as an electronic products manufacturer, a public utility company, or a soap products firm. The switch permits a control of variable resistors such as ACE′, RND′, and PNA′ of the first branch of the positive loop; resistors 28 and DCE′ of the first branch of the negative loop; resistor 35 of the second branch; and resistor 48, ACE‴, and DCE‴ of the sixth branch of the negative loop.

In describing the various operations of the simulator as the master switch is turned, it will be convenient to refer to various meters and their associated branch of the network which are switched in and out of circuit. The elements included can be readily obtained by inspection of FIG. 1.

Before describing the operation of the system in detail, the overall layout of the console panel will be described. At the top left of the console the meters OPR, OPC, TAX, IND, DIV, RER and DEP are arranged left-to-right across the top. The master meter is in the upper right-hand corner, and its face is larger than the other meters. Beneath the master meter are the variable resistor control knobs for the "Situation Factors" including the dividend payout (DS), the outlook for the national economy (NEC), the corporate income tax rate (TS), the demand for company product or service (DEM), the characterization of the organization under study (OS), and the results from efforts to discover new investment opportunities (RES).

The step switch SS is at the left side of the console and may be controlled with the left hand while the other various resistive controllers are manipulated with the right hand. An on/off flow switch is arranged at the lower left-hand corner of the meter, and this double-pole, double-throw switch is in series with each of the sources 24 and 25 of FIG. 1 although it is not shown since it is not essential to the understanding of the network.

Although the invention is not so limited, it is preferred to use commercially-available ten-turn variable resistors of the type wherein a central knob may be turned through a series of ten revolutions to achieve a vernier adjustment of the overall range of the variable resistor. A one percent accuracy on these elements is sufficient for educational purposes.

Each of the five fixed positions of the switch SS are shown, and for each position, there is provided on the faceplate panel, line indicia, designated respectively 50, 51, 52, 53 and 54 for indicating which of the various five steps is set for the computation process.

OPERATION

As a preliminary step, the "Situation Factors" DS, NEC, TS, DEM, OS, and RES are adjusted to desired settings for observation. DS, TS, and OS are multiwafer switches and NEC, DEM, and RES are each a set of mechanically-interconnected variable resistances. The invention is not limited to this specific example however.

Next the multiwafer master step switch is moved to position 1, indicia 50, the starting position. In this position, SS1, SS5 and SS6 are open; therefore, the entire positive loop of the network of FIG. 1 comprises source 25, meter OPR and the variable resistor 26. In the negative loop of the network, SS2 completes a circuit to include the tax meter TAX and its branch of the network; SS3 and SS2 complete a branch including meter RER for the calculation of retained earnings which may be set depending upon the particular position of the dividend switch DS and the tax switch TS. While the master switch is in the same position, the wafer SS4 completes a branch with variable resistor 48 which is set to a value representative of depreciation.

Next the double-pole, double-throw flow switch is moved to the "on" position. Then, the variable resistor 30, controlled in the position 1 "block," is adjusted to cause the zero-center master meter to read zero and thus balance flows of the positive and negative circuit loops according to the equation:

$$OPR = OPC + TAX + IND + DIV + RER + DEP$$

This step is analogous to the computation of income tax (TAX), dividends (DIV), and retained earnings (RER), having been provided the data for operating revenues (OPR), operating costs (OPC), interest on debt capital (IND), depreciation expense (DEP), dividend payout ratio (DS) and income tax rate (TS). Variable resistor 30 simply controls the combined flow through TAX, DIV, and RER. Each of the meters OPR, OPC, TAX, IND, DIV, RER, and DEP can be direct reading with units of milliamperes (or dollars). The internally-generated funds can be determined by adding the meter readings of RER and DEP.

Next the multiwafer master step switch is moved to position 2, indicia 51, in which the positive loop of the network remains unchanged while SS3, SS4, SS5, and SS6 are open, and SS2 is still in circuit. Thus the negative loop electrical flow which passed through RER and DEP in position 1, now flows through the master meter on the null line and is analogous to the internally-generated funds (IGF) for the previous year. By opening the RER and DEP circuits their combined metered flows are added and the read-out is available on the master meter. These internally-generated funds are now available for capital expenditures in the next step.

Next the multiwafer master step switch is turned to position 3, indicia 52; internally-generated funds available for spending continue to show on the master meter as in the preceding step. This step is a decision and control step in which the level of three factors in the capital budget and three factors in the operating budget are controlled. In this position, a variable resistor EXF' is added to the positive loop through SS3. SS1, SS4, and SS6 are open; and by virtue of SS5 and SS3, resistors ACE''' and DCE''' are coupled into the negative loop. A proper level of capital expenditures requires that the sum of these expenditures be balanced by the sum of the internally-generated funds plus external funds. Thus there is an interaction of the four parameters ACE, DCE, EXF, and IGF in the decision process. This step also requires decisions on the proper budget level for industrial engineering effort (IEE), research and development (RND), and price and advertising (PNA). These adjustments will not affect meter readings while the master step switch is in position three, but will affect meter readings of subsequent positions. As mentioned, each of the six controls DCE, ACE, EXF, IEE, RND, and PNA is a set of mechanically interlocked variable resistors, but could function equally well as multiwafer switches with fixed resistors. These controls are located to the right of indicia 52; they are arranged in a matrix of three columns and two rows with the three first-named resistors in the top row of this matrix.

Next, the multiwafer master step switch is turned to position 4, indicia 53. When the step switch is turned to fixed position 4, SS1 is closed thereby adding the six variable resistors NEC', DEM', RES', ACE', RND' and PNA' to the positive loop of the network; SS2 is closed thereby energizing OPC and its branch. SS6 is also closed through SS2 thereby inserting variable resistor 38 in series with the computation of tax and dividend and retained earnings. In addition, SS3, SS4, and SS5 are also enclosed adding ACE'' and DCE'' to the computation of depreciation. In this position, income tax, dividends and retained earnings for the current year are computed via adjustment of variable resistor 38. The process here is very similar to that of position 1 except that certain influential parameters have been updated in position 3. The variable resistor 38, controlled in the position 4 "block"; is adjusted to cause the zero center master meter to read zero and thus balance flows of the positive and negative circuit loops. This step is analagous to the computation of income tax (TAX), dividends (DIV), and retained earnings (RER), having been provided the data for operating costs (OPC), interest on debt capital (IND), depreciation expense (DEP), dividend payout ratio (DS), and income tax rate (TS). Variable resistor 38 simply controls the combined flow through TAX, DIV, and RER.

Next the master step switch is advanced to position 5, indicia 54; in this position SS1, SS2, and SS6 are closed while SS3, SS4 and SS5 are open. As in position 2, the RER and DEP circuits are open, and thus their combined metered flow is observable on the master meter; effectively, the flows have been added and the read-out is available on the master meter. These internally generated funds provide some measure of the success or failure of decisions made in position 3.

In the final fixed position for the step switch, namely, position 5, the internally-generated funds for the current year are computed by reading the amount displayed on the master meter. In this position, SS1, SS2, and SS6 are closed; and SS3, SS4, and SS5 are open. To obtain the benefit of past history, an operator may now attempt to improve upon the results by adjusting the controls of position 3. If DCE or ACE are adjusted, EXF must also be adjusted to compensate. Because these factors interact, optimizing them on an ad hoc basis does not necessarily maximize internally generated funds. As the adjustment procedure continues, the observer should be aware of achieving an optional adjustment with successive trials. Obviously, the whole procedure can be repeated after changing the situation factors at the right side of the panel for study of the economic system under different conditions.

It will be appreciated that this preferred arrangement of a very simple circuit network including only switches, variable and fixed resistors, meters, and batteries has allowed the simulation of a very complex economic equation. Further, the apparatus vividly displays the interaction of the various economic factors; and through the use of discrete resistance values, the computation of various of the individual factors is facilitated.

Having thus described in detail a preferred embodiment of a network as well as a preferred layout for the console panel; it will be obvious that various of the network elements and structure as well as the illustrated panel layout may be changed without departing from the principle in the invention; therefore, it is intended that all such modifications and substitutions be covered as they are embraced within the spirit and scope of the appended claims.

I claim:

1. An electrical network for simulating an economic system comprising: first and second network loops connected in circuit and including a common branch; source means energizing said loops, the current flowing through said common branch from said first loop opposing the current flowing through said branch from said second loop whereby zero current in said common branch represents a balance between said loops; a master meter in said common branch for measuring the net current therein; first impedance means in said first loop for controlling the current therein; a second impedance means selectively switchable in circuit with said first loop including a network of settable impedances for adding a current in said first loop representative of operating revenues; third impedance means in said second loop for controlling the current therein; and a plurality of impedance branches selectively switchable in said second loop, each of said plurality of impedance branches settable for adding currents in said second loop representative of different factors contributing to operating costs.

2. A network according to claim 1 wherein each of said selectable means is coupled to a multiwafer master switch for connecting said impedance means and said branches in circuit; and wherein said plurality of branches selectively switchable in circuit with said second loop comprises: a tax-simulating branch including a plurality of different resistors having a common terminal coupled to said common branch, tax switch means having first and second wafers, one of said tax switch wafers selecting one of said resistors in said tax simulating branch for completing a circuit; and first and second variable balancing resistors selectively switchable in said tax branch by said master switch; a dividend-simulating branch including a first plurality of sets of fixed resistors selectable by the second wafer of said tax switch, said sets being switched in circuit with said first and second balancing resistors of said tax branch; and a retained-earnings-simulating branch including a second plurality of sets of fixed resistors selectably by the second wafer of said tax switch, said second sets being switched in circuit with said first and second balancing resistors of said tax branch, said first and second plurality of sets of resistors and said plurality of resistors in said tax branch being selected to alter the proportion of current flow in each branch while maintaining a constant total current in the same.

3. A network according to claim 2 wherein the second impedance means switchable in said first loop includes a first parallel set of variable resistors including values representative of NEC, DEM and RES; a second parallel set of variable resistors in series with said just-named first set including values representative of ACE, RND and PNA; and a wafer of said master switch for switching these first and second sets in circuit as a branch in said first network loop.

4. A network according to claim 3 further comprising a variable resistor representative of EXF switchable in circuit as a branch in said first network loop.

5. A network according to claim 4 wherein one of said plurality of branches switchable in circuit with said second loop includes a third parallel set of resistors including values representative of NEC, DEM, and RES: a fourth parallel set of variable resistors in series with said third set including values representative of DCE, RND and PNA; a variable resistor representative of IEE connected across the series combination of said third and fourth sets; and a wafer of said master switch for switching said just-named branch in circuit with said second loop.

6. A network according to claim 5 further including a meter for measuring the current in each of said branches in said second loop and in the first branch of said first loop.

7. A network according to claim 6 wherein said plurality of branches in said second loop also includes a branch for simulating depreciation (DEP) comprising: a meter for measuring current representative of DEP, a variable resistor in series with said DEP meter and a wafer of said master switch, a parallel combination of variable resistors representative of ACE and DCE and a separate wafer of said master switch for switching said parallel combination in circuit across said variable resistor in series with said DEP meter.

8. A network according to claim 7 wherein another of said plurality of branches switchable in circuit with said second loop includes a parallel combination of variable resistors representative of ACE and DCE switchable in said circuit by said master switch.

9. A network according to claim 8 wherein said network is housed in a console defining a panel including meters for measuring OPR, OPC, TAX, IND, DIV, RER, and DEP, said meters arranged in line across the top of said panel together with said master meter, said settable resistors (NEC, DEM, and RES) together with an organization factor arranged and said switches (DS and TS) beneath said master meter, said master switch means being located beneath said meters and including indicia associated with each of five steps for operating said network to simulate said economic system, the indicia associated with first step being further associated with a resistor (30), the indicia associated with step three being further associated with said variable resistors (DCE, ACE, EXF, IEE, RND, and PNA), and the indicia associated with step four being further associated with said variable resistor (38).

References Cited

UNITED STATES PATENTS

| | | | |
|---|---|---|---|
| 2,916,212 | 12/1959 | Mita | 235—184 |
| 3,027,083 | 3/1962 | Heigl et al. | 235—184 |
| 3,406,281 | 10/1968 | Buchanan et al. | 235—184 X |

WILLIAM H. GRIEB, Primary Examiner

E. R. CAPOZIO, Assistant Examiner

U.S. Cl. X.R.

235—184